(12) United States Patent
Madsen et al.

(10) Patent No.: US 9,991,805 B2
(45) Date of Patent: Jun. 5, 2018

(54) ON AND OFF CONTROLLED RESONANT DC-DC POWER CONVERTER

(71) Applicant: Danmarks Tekniske Universitet, Kgs. Lyngby (DK)

(72) Inventors: Mickey P. Madsen, Kgs. Lyngsby (DK); Milovan Kovacevic, Kgs. Lyngby (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 0 days. days.

(21) Appl. No.: 15/110,002

(22) PCT Filed: Feb. 26, 2015

(86) PCT No.: PCT/EP2015/053977
§ 371 (c)(1),
(2) Date: Jul. 6, 2016

(87) PCT Pub. No.: WO2015/128397
PCT Pub. Date: Sep. 3, 2015

(65) Prior Publication Data
US 2016/0365795 A1    Dec. 15, 2016

(30) Foreign Application Priority Data
Feb. 27, 2014 (EP) .................. 14156928

(51) Int. Cl.
*H02M 3/335* (2006.01)
*H02M 3/338* (2006.01)
(Continued)

(52) U.S. Cl.
CPC ......... *H02M 3/33523* (2013.01); *H02M 1/14* (2013.01); *H02M 3/158* (2013.01);
(Continued)

(58) Field of Classification Search
CPC . H02M 2001/0025; H02M 2001/0058; H02M 3/005; H02M 3/33523;
(Continued)

(56) References Cited

U.S. PATENT DOCUMENTS 5,991,171 A * 11/1999 Cheng ............... H02M 3/33507
                                                363/21.03
6,084,792 A * 7/2000 Chen ................. H02M 3/33592
                                                363/127

(Continued)

FOREIGN PATENT DOCUMENTS

EP          0 316 892 A2      5/1989
WO     WO 2012/024542 A2      2/2012
(Continued)

OTHER PUBLICATIONS

Chan, Tso-Sheng et al., "A Primary Side Control Method for Wireless Energy Transmission System" IEEE Transactions on Circuits and Systems-I: Regular Papers, Aug. 2012, pp. 1805-1814, vol. 59, No. 8.
(Continued)

*Primary Examiner* — Fred E Finch, III
(74) *Attorney, Agent, or Firm* — Knobbe, Martens, Olson & Bear, LLP

(57) ABSTRACT

The present invention relates to a resonant DC-DC power converter comprising an input side circuit comprising a positive and a negative input terminal for receipt of an input voltage or current and an output side circuit comprising positive and negative output terminals for supply of a converter output voltage and connection to a converter load. The resonant DC-DC power converter further comprises a rectification circuit connected between an output of a resonant network and the output side circuit. The resonant network is configured for alternatingly being charged from the input voltage or current and discharged through the
(Continued)

rectification circuit by a first controllable switch arrangement in accordance with a first switch control signal. A second controllable switch arrangement of the resonant DC-DC power converter is configured to select a first impedance characteristic of the resonant network in a first switch state and select a second impedance characteristic of the resonant network in a second switch state. An output voltage or current control circuit is configured to adjust the converter output voltage and/or current by activating and interrupting the first switch control signal in accordance with the switch state of the second controllable switch arrangement.

17 Claims, 6 Drawing Sheets

(51) Int. Cl.
    *H02M 3/158*     (2006.01)
    *H02M 3/337*     (2006.01)
    *H02M 1/14*     (2006.01)
    *H02M 7/48*     (2007.01)
    *H02M 1/00*     (2006.01)

(52) U.S. Cl.
    CPC ......... *H02M 3/338* (2013.01); *H02M 3/3376* (2013.01); *H02M 2001/0058* (2013.01); *H02M 2007/4818* (2013.01); *Y02B 70/1425* (2013.01); *Y02B 70/1433* (2013.01); *Y02B 70/1491* (2013.01)

(58) Field of Classification Search
    CPC .. H02M 3/3376; H02M 3/338; H02M 3/3381; H02M 3/3385; H02M 2007/4818; Y02B 70/1425; Y02B 70/1433
    See application file for complete search history.

(56) References Cited

U.S. PATENT DOCUMENTS

| | | | |
|---|---|---|---|
| 7,599,198 B2 | 10/2009 | Tao et al. | |
| 2007/0171680 A1 | 7/2007 | Perreault et al. | |
| 2011/0176335 A1 | 7/2011 | Li et al. | |
| 2012/0250356 A1 | 10/2012 | Hu et al. | |
| 2012/0250382 A1* | 10/2012 | Frattini | H02M 3/33569 363/126 |
| 2013/0033903 A1* | 2/2013 | Teggatz | H02M 3/3387 363/16 |
| 2013/0107579 A1* | 5/2013 | Hosotani | H02M 3/3382 363/16 |
| 2013/0121033 A1* | 5/2013 | Lehn | H02M 3/335 363/17 |
| 2013/0301306 A1* | 11/2013 | Hosotani | H02M 3/338 363/21.02 |
| 2015/0098252 A1* | 4/2015 | Spinella | H02M 3/005 363/21.01 |
| 2015/0124487 A1* | 5/2015 | Fu | H02M 3/33569 363/17 |
| 2015/0162840 A1* | 6/2015 | Frost | H02M 3/33569 363/17 |

FOREIGN PATENT DOCUMENTS

WO    WO 2013/010782 A2    1/2013
WO    WO 2013/150352 A1    10/2013

OTHER PUBLICATIONS

International Search Report for PCT/EP2015/053977 dated May 22, 2015.

* cited by examiner

ON AND OFF CONTROLLED RESONANT DC-DC POWER CONVERTER

CROSS REFERENCE TO RELATED APPLICATIONS

This application is a U.S. National Phase Application of PCT International Application Number PCT/EP2015/053977, filed on Feb. 26, 2015, designating the United States of America and published in the English language, which is an International Application of and claims the benefit of priority to European Patent Application No. 14156928.5, filed on Feb. 27, 2014. The disclosures of the above-referenced applications are hereby expressly incorporated by reference in their entireties.

The present invention relates to a resonant DC-DC power converter comprising an input side circuit comprising a positive and a negative input terminal for receipt of an input voltage or current and an output side circuit comprising positive and negative output terminals for supply of a converter output power, voltage or current and connection to a converter load. The resonant DC-DC power converter further comprises a rectification circuit connected between an output of a resonant network and the output side circuit. The resonant network is configured for alternatingly being charged from the input voltage or current and discharged through the rectification circuit by a first controllable switch arrangement in accordance with a first switch control signal. A second controllable switch arrangement of the resonant DC-DC power converter is configured to select a first impedance characteristic of the resonant network in a first switch state and select a second impedance characteristic of the resonant network in a second switch state. An output voltage or current control circuit is configured to adjust the converter output voltage and/or current by activating and interrupting the first switch control signal in accordance with the switch state of the second controllable switch arrangement.

BACKGROUND OF THE INVENTION

Power density and component costs are key performance metrics of both isolated and non-isolated DC-DC power converters to provide the smallest possible physical size and/or lowest costs for a given output power requirement or specification. Resonant power converters are particularly useful for high switching frequencies such as frequencies above 1 MHz where switching losses of standard SMPS topologies (Buck, Boost etc.) tend to be unacceptable for conversion efficiency reasons. High switching frequencies are generally desirable because of the resulting decrease of the electrical and physical size of circuit components of the power converter like inductors and capacitors. The smaller components allow increase of the power density of the DC-DC power converter. In a resonant power converter an input "chopper" semiconductor switch (often MOSFET or IGBT) of the standard SMPS is replaced with a "resonant" semiconductor switch. The resonant semiconductor switch relies on resonances of a resonant network typically involving various circuit capacitances and inductances to shape the waveform of either the current or the voltage across the semiconductor switch such that, when state switching takes place, there is no current through or no voltage across the semiconductor switch. Hence power dissipation is largely eliminated in at least some of the intrinsic capacitances or inductances of the input semiconductor switch such that a dramatic increase of the switching frequency into the VHF range becomes feasible for example to values above 30 MHz. This concept is known in the art under designations like zero voltage and/or zero current switching (ZVS and/or ZCS) operation. Commonly used switched mode power converters operating under ZVS and/or ZCS are often described as class E, class F or class DE inverters or power converters.

However, it remains a significant challenge to adjust or control the output power/voltage/current of resonant DC-DC power converters in an efficient way. If the resonant power converter is controlled by Pulse Width Modulation (PWM) of the "resonant" semiconductor switch, the ZVS ability is lost and power conversion efficiency will drop significantly. Varying the switching frequency of the resonant power converter has also been applied in prior art power converters to control the output voltage/current of the resonant power converter, but this control methodology suffers from a limited range of output voltage regulation and increasing power conversion losses. Controlling the output voltage/current of the resonant power converter by a control scheme which is a combination of variable switching frequency and PWM has also been applied in existing resonant power converters and generally proved to work well. This control methodology or scheme unfortunately leads to highly complex control circuitry.

Another more simple yet efficient way of controlling or adjusting the output power/voltage/current of resonant DC-DC power converters has been to turn on and off the entire resonant power converter in an intermittent manner. This control scheme is designated "burst mode control" or "on/off control". Burst mode control allows the resonant power converter to operate at a fixed switching frequency where the conversion efficiency is high or optimal during on or activate time periods. During time periods where the power converter is off or deactivated, power losses are essentially eliminated because of the lack of switching activity of the resonant transistor which drives the resonant power converter. Ideally burst mode control of resonant power converter leads to full load regulation and constant efficiency from zero to full load on the converter.

On/off control of prior art resonant power converters has been achieved by controlling the signal voltage on the control terminal of a "resonant" semiconductor switch, e.g. a MOSFET gate terminal. This scheme may work in a satisfactory manner in some applications, but in order to regulate or adjust the converter output voltage and current a feedback control signal from the output/secondary side of the converter to the control terminal of the resonant" semiconductor switch is required. This presents a significant problem in isolated resonant power converters because the feedback control signal must cross a galvanic isolation barrier between the primary side circuitry and the secondary side circuitry. Traditionally, to maintain the galvanic isolation between input side circuitry and output side circuitry of the resonant power converter, the control signal to the resonant semiconductor switch has been transmitted through a relatively slow and expensive optocoupler or through a bulky and slow transformer. The time delay through the optocoupler or transformer presents, however, a serious obstacle to on/off control of resonant power converters where a fast transient response is highly desirable to provide adequate control of the converter output voltage and current. The time delay problem is particularly pronounced for high frequency resonant power converters operating with switching frequencies at or above 20 MHz.

TSO-SHENG CHAN ET AL: "A Primary Side Control Method for Wireless Energy Transmission System", IEEE Transactions on Circuits and Systems i: regular papers, IEEE, Vol. 59, No. 8 discloses a wireless energy transmission system (WETS) transferring power from a primary side circuit to a secondary side circuit through a skin barrier. The IEEE paper discloses a resonant class E based DC-DC power converter with an inductive power transformer connecting the input side circuit and output side circuit through the skin barrier. A charging protection circuit comprise a controllable secondary side switch (Ms) which selectively connects and disconnects a battery (Vb) load from the output of the power converter. A primary side controller operates by detecting variations of the input current and phase of the input reactance to determine the state of the secondary side switch (Ms). The proposed range of switching frequencies of the class E based DC-DC power converter is between 83-175 kHz.

In view of these problems and challenges associated with prior art resonant power converters, it would be advantageous to provide a novel control mechanism for on/off control of resonant power converter eliminating the need to transmit the feedback control signal from an output voltage control circuit across a galvanic isolation barrier to the control terminal of the resonant semiconductor switch. The elimination of the feedback control signal would also be advantageous in non-isolated resonant power converters because of the time delay and occupation of board or carrier area associated with wiring of the feedback control signal to the resonant transistor.

In view of the above, it remains a challenge to reduce the size and lower component costs of both isolated and non-isolated resonant DC-DC power converters. It also remains a challenge to provide an output voltage control mechanism with fast transient response to provide good regulation of the converter output voltage even for high frequency resonant power converters. Hence, a novel control mechanism for resonant power converters which simplifies the control of the converter output voltage and reduces the number of electronic components required to perform the output voltage regulation is highly desirable.

SUMMARY OF THE INVENTION

A first aspect of the invention relates to a resonant DC-DC power converter comprising an input side circuit comprising a positive and a negative input terminal for receipt of an input voltage or current and an output side circuit comprising positive and negative output terminals for supply of a converter output power, voltage or current and connection to a converter load. The resonant DC-DC power converter further comprises a rectification circuit connected between an output of a resonant network and the output side circuit. The resonant network is configured for alternatingly being charged from the input voltage or current and discharged through the rectification circuit by a first controllable switch arrangement in accordance with a first switch control signal, wherein a frequency of the switch control signal lies at or above 20 MHz, more preferably at or above 30 MHz. A second controllable switch arrangement of the resonant DC-DC power converter is configured to select a first impedance characteristic of the resonant network in a first switch state and select a second impedance characteristic of the resonant network in a second switch state. An output voltage or current control circuit is configured to adjust or regulate the converter output voltage and/or current by activating and interrupting the first switch control signal in accordance with a switch state of the second controllable switch arrangement.

The first and second impedance characteristics of the resonant network may exhibit different resonance frequencies and/or different Q values at the resonance frequency as explained in additional detail below. A switching frequency of the first switch control signal is preferably located approximately at the resonance frequency of the resonant network when the resonant DC-DC power converter is operational or turned on to ensure high power conversion efficiency.

The output voltage and/or current control circuit is capable of regulating the converter output voltage or current by controlling the state, i.e. conducting state or non-conducting state, of the second controllable switch arrangement and thereby turn off or turn on operation of the present resonant DC-DC power converter. Since the second controllable switch arrangement may conveniently be arranged in the output side circuit of the resonant DC-DC power converter, the output voltage of the converter may be adjusted by a voltage or current control loop arranged entirely on the output side of the converter. Hence, output voltage and/or current regulation of isolated variants of the resonant DC-DC power converter can be achieved via control of components placed in the secondary side circuit only. The need of feeding an output control signal, such as an output voltage signal or output current signal, back to the input side or primary side of such isolated resonant DC-DC power converters has been eliminated. As mentioned above, this elimination of the need to transmit a feedback control signal back to the input side or primary side circuit, in particular to the control terminal of the first switch arrangement, is advantageous in both non-isolated and isolated variants of the present resonant DC-DC power converters. In connection with the isolated resonant DC-DC power converters, the elimination of the feedback control signal to the first switch arrangement of the input side circuit removes the need for expensive, bulky and costly isolation devices such as opto-couplers or transformers to transmit the feedback control signal across the galvanic isolation barrier.

In connection with the non-isolated resonant DC-DC power converters, the ability to carry out the output voltage and/or current regulation in the output side circuit eliminates the time delay and board space occupation associated with the wiring of the feedback control signal to the first switch arrangement of the input side circuit. This improves the transient response of the non-isolated resonant DC-DC power converter so as to provide better regulation of the converter output voltage and/or current to the load. This feature is particularly advantageous for resonant DC-DC power converter operating at VHF switching frequencies at or above 30 MHz where short delay times in turning on and turning off the power converter improves regulation performance.

The second controllable switch arrangement may be inserted at various locations of the output side circuitry of the resonant DC-DC power converter to select between the first and second impedance characteristics of the resonant network. The second controllable switch arrangement is preferably coupled to an output of the resonant network. According to one embodiment, the second controllable switch arrangement is coupled in series between an output of the rectification circuit and the positive or the negative output terminal to connect the converter load in a conducting switch state and disconnect the converter load in a non-conducting switch state. In this manner the positive or negative output terminal and converter load may be electrically disconnected from the residual portion of the resonant DC-DC power converter in the off state of the converter.

The rectification circuit is preferably designed to exhibit substantially resistive impedance at a resonance frequency of the resonant network with the connected converter load. In this situation, the first impedance characteristic, including the resonance frequency, of the resonant network may be determined by one or more interconnected inductors and capacitors of the resonant network with negligible influence from components of the rectification circuit. On the other hand, when the converter load is disconnected from the output of the rectification circuit by the second controllable switch arrangement, the rectification circuit may exhibit a different and non-resistive input impedance which loads the resonant network. This non-resistive loading leads to a change of the impedance characteristics of the resonant network so as to select the second impedance characteristic of the resonant network. This second impedance characteristic of the resonant network may exhibit a lower resonance frequency Q value than the Q value at the resonance frequency of the first impedance characteristic. The second impedance characteristic of the resonant network may possess a lower or higher, i.e. different, resonance frequency than the resonance frequency of the first impedance characteristic of the resonant network for example because an inductor and/or a capacitor of the rectification circuit has/have influence on the resonance frequency of the resonant network. These types of differences between the first and second impedance characteristics of the resonant network may be exploited to enable and disable oscillation of a feedback loop around the first controllable switch arrangement as described in further detail below. According to another embodiment, the second controllable switch arrangement is coupled across the output of the resonant network to select the first impedance characteristic of the resonant network in a non-conducing state and the second impedance characteristic of the resonant network in a conducting state.

In another embodiment, the impedance characteristics of the resonant network are changed from the first impedance characteristic to the second impedance characteristic of the resonant network by connecting one or more auxiliary capacitances and/or connecting one or more auxiliary inductances to existing capacitances and inductances, respectively, of the resonant network by the second controllable switch arrangement.

In a preferred embodiment of the resonant DC-DC power converter, the rectification circuit comprises the second controllable switch arrangement; and a control circuit is configured for generating a control signal for the second controllable switch arrangement synchronously to the first switch control signal. In this embodiment, the respective functions of the rectification circuit and second controllable switch arrangement are integrated. In this manner, the second controllable switch arrangement may, in addition to connecting and disconnecting the converter load, operate as a synchronous full-wave or half-wave rectifier and replace functions of one or more ordinary rectifier diodes of the rectification circuit.

The output voltage or current control circuit of the resonant DC-DC power converter may comprise a self-oscillation feedback loop coupled between an output terminal and a control terminal of the first controllable switch arrangement. In this embodiment, the first impedance characteristic of the resonant network is configured to enable oscillation of the self-oscillation feedback loop and the second impedance characteristic of the resonant network is configured to disable oscillation of the self-oscillation feedback loop. Hence, the state switching of the second controllable switch arrangement can be used to activate and interrupt the operation of the power converter by enabling and disabling, respectively, the oscillation or switching of the first controllable switch arrangement. The latter may for example comprise a transistor such as a MOSFET where the self-oscillation feedback loop is connected between a drain and gate terminal of the MOSFET. The skilled person will understand that the self-oscillation feedback loop preferably is arranged entirely in the input side circuit of the resonant DC-DC power converter to avoid transmission of feedback signals of the self-oscillation feedback loop from the output side circuit.

The self-oscillation feedback loop may comprise a first intrinsic switch capacitance coupled between the output and control terminals of the first controllable switch arrangement. The self-oscillation feedback loop further comprises a first bias voltage source configured to generate a first adjustable bias voltage and a first inductor, preferably with substantially fixed inductance, coupled in-between the first bias voltage source and the control terminal of the first controllable switch arrangement. The self-oscillation feedback loop may in addition to the first intrinsic switch capacitance include an external capacitor connected between the output and control terminals of the first controllable switch. The skilled person will appreciate that the first intrinsic switch capacitance may comprises a drain-gate capacitance of a MOSFET transistor contained in the first controllable switch arrangement. Several resonant DC-DC power converter designs based on self-oscillation feedback loops around the input side switch arrangement are disclosed in the applicant's co-pending application PCT/EP2013/072548. The skilled person will understand that these self-oscillation feedback loops may be utilized in the present resonant DC-DC power converters.

The first and second impedance characteristics of the resonant network which enable and disable, respectively, the oscillation of the first controllable switch arrangement may differ in various ways. In one embodiment the Q value of the first impedance characteristic is larger than 5 at the resonance frequency of the first impedance characteristic; and the Q factor of the second impedance characteristic is smaller than 2 at the resonance frequency of the second impedance characteristic. In another embodiment the resonance frequency of the first impedance characteristic is at least 1.4 times larger than the resonance frequency of the second impedance characteristic.

In a range of advantageous embodiments of the resonant DC-DC power converter, the frequency of the first switch control signal is placed at or above 20 MHz such as above at or above 30 MHz in the so-called VHF range. In these embodiments, the above-discussed resonance frequency of the first impedance characteristic of the resonant network is situated at or above 20 MHz, or at or above 30 MHz. The resonance frequency of the first impedance characteristic of the resonant network is preferably situated approximately at the frequency of the first switch control signal. The resonant DC-DC power converters preferably facilitate zero voltage and/or zero current switching of the semiconductor switch or switches driving or exciting the resonant network.

The output voltage or current control circuit may comprise a regulation loop, e.g. a voltage, current or power regulation loop, connected between the converter output voltage/current and a control terminal of the second controllable switch arrangement to adjust the converter output voltage and/or current in accordance with one or more DC reference voltage(s) or current(s). The voltage or current regulation loop may for example comprise a DC reference voltage generator configured to supply the one or more DC reference voltage(s),
one or more comparator(s) configured for comparing the converter output voltage to at least a first DC reference voltage and select the conducting state or the non-conducting state of the second controllable switch arrangement depending on a result of the comparison.

In this embodiment, the voltage regulation loop may use a single DC reference voltage to adjust the converter output voltage. The resonant DC-DC power converter may be turned off when the converter output voltage exceeds the single DC reference voltage by selecting an appropriate state of the second controllable switch arrangement. Likewise, the DC-DC power converter may be turned on when the converter output voltage is smaller than the single DC reference voltage by selecting the opposite state of the second controllable switch arrangement.

In an alternative embodiment of the resonant DC-DC power converter the voltage or current regulation loop comprises at least two different DC reference voltages or currents which are utilized as references for controlling output regulation. In this embodiment, the DC reference voltage generator is configured to supply at first DC reference voltage and a second DC reference voltage where the first DC reference voltage is higher than the second DC reference voltage; The one or more comparator(s) is configured to:
comparing the converter output voltage to the first and second DC reference voltages; and
selecting one of the conducting and non-conducting states of the second controllable switch arrangement in response to the converter output voltage exceeding the first DC reference voltage,
selecting the opposite state of the second controllable switch arrangement in response to the converter output voltage falls below the second DC reference voltage.

As previously mentioned, the resonant DC-DC power converter may comprise a galvanic isolation barrier. The galvanic isolation barrier is preferably arranged between the input side circuit and the output side circuit to provide galvanic isolation between the converter output voltage and the input side circuit. This galvanic isolation barrier may comprise a pair of magnetically coupled inductors comprising a first inductor electrically connected to the input side circuit and a second inductor electrically connected to the input of the rectification circuit. The pair of magnetically coupled inductors may comprise a transformer. In another embodiment, the galvanic isolation barrier comprises first and second coupling capacitors. The first coupling capacitor may be arranged in a signal carrying line of the resonant power converter for example in series between the output of the resonant network and the rectification circuit. The second coupling capacitor may be arranged in a negative voltage wire or ground wire of the resonant power converter between the input and output side circuits. The coupling capacitor based galvanic isolation barrier is particularly useful in resonant DC-DC power converters operating at or above 20 MHz because of the relatively small capacitances required of the first and second capacitors at such high frequencies. The small capacitance allows each of the first and second capacitors to be physically small and be implemented as non-electrolytic SMD capacitors for example ceramic capacitors with a capacitance below 100 nF.

The skilled person will understand that all resonant DC-DC power converter topologies may be used in the present invention for example SEPIC, class E, class F, class DE or converter topologies derived from these. Several exemplary isolated and non-isolated resonant DC-DC power converters of Class E topology are described in detail below in connection with the appended drawings.

The first controllable switch arrangement may comprise one or more semiconductor switches and the second controllable switch arrangement may comprise one or more semiconductor switches. Each of the semiconductor switches of the first and second controllable switch arrangements may comprise a semiconductor transistor such as a MOSFET or IGBT such as a Gallium Nitride (GaN) or Silicon Carbide (SiC) MOSFET. The control terminals or terminals of the first controllable switch arrangement may accordingly comprise gate terminal(s) or base terminal(s) of the one or more semiconductor switches. The control terminal of each of the semiconductor switches may be driven by the first switch control signal to alternatingly force the semiconductor switches between on-states and off-states. The control terminals or terminals of the second controllable switch arrangement may comprise gate terminal(s) or base terminal(s) of the one or more semiconductor switches.

One embodiment of the resonant DC-DC power converter comprises a wireless data receiver for receipt of remote data commands to control the switch state of the second controllable switch arrangement. The remote data command may be used to interrupt or activate operation of the resonant DC-DC power converter by commands received via a wireless home automation network. The remote data command may be inputted to the output voltage or current control circuit that controls the state switching of the second controllable switch arrangement. In this manner, the resonant DC-DC power converter can be switched ON or OFF or regulated via remote control. The wireless data receiver may be compliant with various industry standard wireless data communication protocols such as the ZigBee communication protocols or wired data communication protocols such as the Digital Addressable Lighting Interface (DALI) and protocol.

The skilled person will appreciate that the first controllable switch arrangement may be formed by a single transistor, for example a NMOS device, or several interconnected transistors depending on the selected topology of the resonant DC-DC power converter. In some embodiments, the first controllable switch arrangement may comprise a half-bridge switch topology or a full-bridge switch topology.

The galvanic isolation barrier may comprise a transformer which comprises a pair of magnetically coupled inductors comprising a first inductor electrically connected to the primary side circuit and a second inductor electrically connected to the output side circuit. The first and second inductors could be discrete windings both wound around a common magnetic permeable structure to form an isolation transformer. In an alternative embodiment, the first and second inductors are integrated in a printed circuit board without intervening magnetic material. The printed circuit board could have the entire DC-DC power converter mounted thereon.

One embodiment of the resonant DC-DC power converter is arranged on a single substantially flat carrier substrate to form a compact, low cost and single unit power converter assembly that is well-suited for integration in various kind of consumer equipment such as LED lamps and battery chargers. The latter embodiment of the resonant DC-DC power converter comprises a single substantially flat carrier substrate comprising a first surface and a second, opposing, surface, wherein the input side circuit, the output side circuit, the rectification circuit, the resonant network, the first controllable switch arrangement, the second controllable switch arrangement and the output voltage or current control circuit are arranged on the first surface and/or the second surface. The flat carrier substrate may comprise a single sided or double-sided printed circuit board, which may comprise additional layers between a top layer comprising the first surface and a bottom layer comprising the second surface. The skilled person will appreciate that respective passive and active electronic components of the input side circuit, the output side circuit, the rectification circuit, the resonant network, the first controllable switch arrangement, the second controllable switch arrangement and the output voltage or current control circuit may be attached to the upper and/lower carrier surfaces by soldering or gluing.

A second aspect of the invention relates to a method of operating a resonant DC-DC power converter to generate a converter output voltage or current, said method comprising steps of:

a) alternatingly charging and discharging a resonant network of the resonant converter from an input voltage or current source by a first controllable switch arrangement in accordance with a first switch control signal,
b) rectifying a resonant current of the resonant network,
c) discharging a rectified resonant current to a rectification circuit to produce a rectified output voltage,
d) switching between a first impedance characteristic or a second impedance characteristic of the resonant network by selecting a first or a second switch state of a second controllable switch arrangement,
e) adjusting a converter output voltage or current by alternatingly activating and interrupting the first switch control signal in accordance with first and second switch states of the second controllable switch arrangement.

BRIEF DESCRIPTION OF THE DRAWINGS

Preferred embodiments of the invention will be described in more detail in connection with the appended drawings, in which.

DETAILED DESCRIPTION OF PREFERRED EMBODIMENTS

Figure 1:
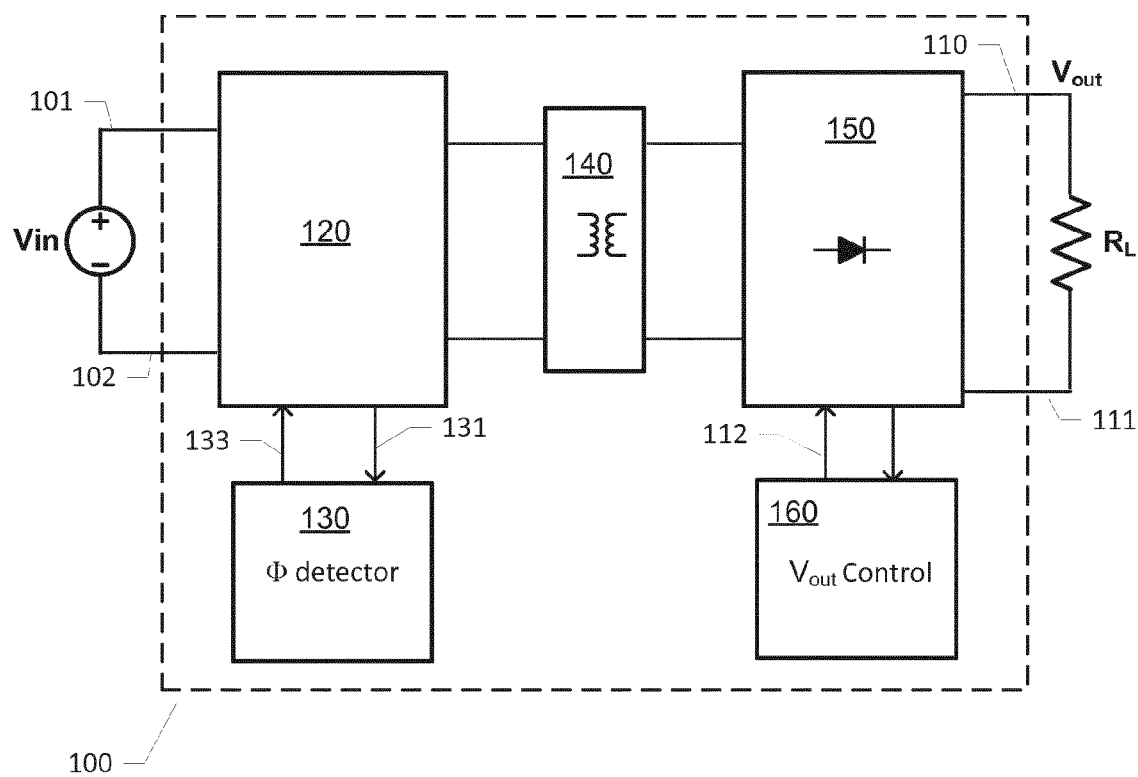
FIG. 1 is a top-level schematic block diagram of resonant DC-DC power converters in accordance with preferred embodiments of the invention, FIG. 1A) is a schematic block diagram of a power converter assembly comprising resonant DC-DC power converters in accordance with preferred embodiments of the invention.

FIG. 1 shows a simplified schematic block diagram of a resonant DC-DC power converter 100 in accordance with preferred embodiments of the present invention. Detailed schematic circuit diagrams of exemplary embodiments of the present resonant DC-DC power converters are described below with reference to FIGS. 2, 3, 4 and 5. The resonant DC-DC power converter 100 comprises an input block 120 and an output block 150 connected through an optional galvanic isolation barrier 140. The galvanic isolation barrier 140 may comprise various types of electrical insulation elements or components such as a pair coupling capacitors or a pair of magnetically coupled inductors such as a transformer. The input block 120 comprises an input side circuit which comprises a positive input terminal 101 and a negative input terminal 102 for receipt of a DC or AC input voltage $V_{in}$ from a voltage or power source. The input side circuit may comprise an input capacitor (not shown) electrically connected between the positive and negative input terminals 101, 102 to form an energy reservoir for the input voltage source and suppress ac ripple voltage components and/or noise components of the DC or AC input voltage $V_{in}$. The output block 150 comprises an output side circuit comprising positive and negative output terminals 110, 111, respectively, for supplying a converter DC output voltage $V_{out}$ and connection to a converter load. The converter load is schematically represented by load resistor $R_L$. The output block 150 further comprise a rectification circuit, schematically represented by the diode symbol, connected between an output of a resonant network (not shown) of the resonant DC-DC power converter 100 and the output side circuit. The input block 120 comprises a first controllable switch arrangement, comprising at least one controllable semiconductor switch, operable in accordance with a switch control signal. The controllable semiconductor switch or switches may comprise a transistor such as a BJT, MOSFET or IGBT where the base or gate terminal(s) are coupled to the switch control signal. The controllable switch arrangement is coupled to the resonant network such that the latter is alternatingly charged from the DC or AC input voltage and discharged the rectification circuit to produce the DC output voltage $V_{out}$. A frequency of the switch control signal of the first controllable switch arrangement accordingly sets the switching frequency of the resonant DC-DC power converter 100. The resonant network may be exclusively arranged in the input block 120 in some embodiments of the invention while the resonant network in other embodiments may include certain passive components of the galvanic isolation barrier 140 and/or rectification circuit. The resonant network preferably comprises at least one capacitor and at least one inductance connected to each other. The resonant DC-DC power converter 100 further comprises an output voltage or current control circuit 160 which is configured to adjust the DC output voltage $V_{out}$ by activating and interrupting the previously discussed switch control signal of the first controllable switch arrangement in accordance with a switch state of a second controllable switch arrangement (not shown). The switch state of a second controllable switch arrangement is controlled via control line or wire 112 which may be connected to a suitable control terminal of the second controllable switch arrangement as discussed in additional detail below. When the switch control signal of the first controllable switch arrangement is interrupted or stopped, i.e. not switching, the resonant network is no longer charged or excited and the DC output voltage $V_{out}$ gradually decreases due to the current drawn by the converter load. When the switch control signal of the first controllable switch arrangement is activated the resonant network is again charged or excited by the first controllable switch arrangement and supplies resonant current to the rectification circuit and output side circuit such that the DC output voltage $V_{out}$ gradually increases.

Different types of control mechanisms are utilized in different embodiments of the present resonant DC-DC power converter to control the activation and interruption of the switch control signal of the first controllable switch arrangement. In one embodiment, the second controllable switch arrangement is configured to connect and disconnect the converter load $R_L$ such that impedance characteristics of the resonant network are altered. In another embodiment, the impedance characteristics of the resonant network are changed by switching the second controllable switch arrangement between a conducting state and a non-conducting state for example adding one or more auxiliary capacitances or inductances to the resonant network. This change of the impedance characteristics of the resonant network may in certain embodiments be detected by a resonant phase detector 130. The resonant phase detector 130 may be configured to monitor, via monitor line of signal 131, a resonant voltage and a resonant current of the resonant network. The resonant phase detector 130 may configured to measure a change of phase or amplitude between the resonant current and resonant voltage at a nominal resonance frequency of the network caused by the change of the impedance characteristics of the resonant network caused by the state switching of the second controllable switch arrangement.

The resonant phase detector 130 may generate the switch control signal for the first switch arrangement and supply this control signal 133 to the control terminal or terminals of the resonant network such as a base or gate terminal as discussed above. In one advantageous embodiment of the present resonant DC-DC power converter 100, the resonant phase detector 130 is integrated into a self-oscillation feedback loop formed around the first controllable switch arrangement. In this manner, oscillation of the self-oscillation feedback loop is either enabled or disabled according to the switch state of the second controllable switch arrangement as discussed in additional detail below with reference to FIGS. 4 & 5.

Figure 1A:
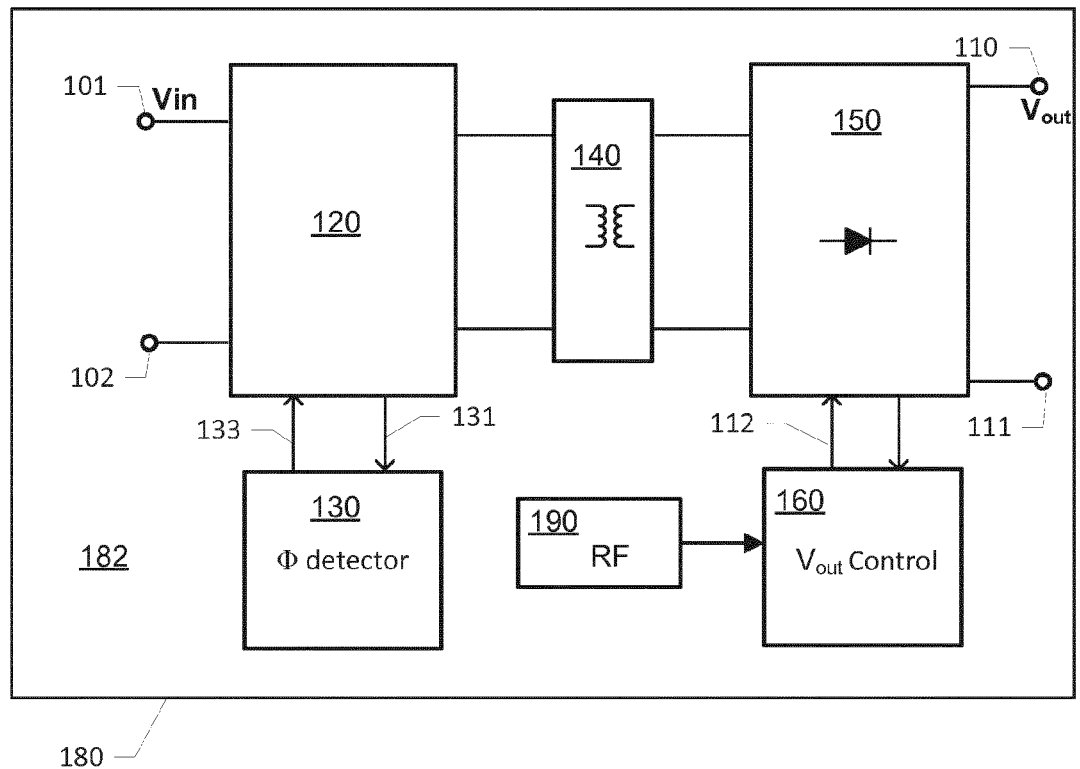

FIG. 1A) illustrates schematically how the resonant DC-DC power converters 100 in accordance with preferred embodiments of the present invention may be arranged on a single substantially flat carrier substrate 180 such as a printed circuit board (PCB). The resonant DC-DC power converter mounted on such a single carrier substrate 180 forms a compact, low cost and single unit power converter assembly that is well-suited for integration in various kind of consumer equipment such as LED lamps and battery chargers. Furthermore, the mounting of the input block 120, the galvanic isolation barrier 140 and the output block 150 on a common carrier substrate allows high power conversion efficiency because the input and output side circuits of the resonant DC-DC power converter are placed proximate to each other. The single substantially flat carrier substrate 180 may comprise an upper or first surface 182 and a second, opposing, surface (not shown). The skilled person will appreciate that passive and active electronic components of the resonant DC-DC power converter embodiment in question may be attached to the upper and/lower carrier surfaces for example by soldering or gluing. These passive and active electronic components may comprise the respective semiconductor switches, capacitors, inductors, terminals, comparators etc. of the resonant DC-DC power converter embodiments 200, 300, 400 and 500 discussed in detail below and illustrated on FIGS. 2, 3, 4 and 5. Likewise, suitable electrical wire traces may be formed on the upper and/lower carrier surfaces of the single flat carrier substrate 180 to interconnect the circuit blocks 120, 130, 140, 150, 160 in a desired manner. The upper or under surface 182 of the substantially flat carrier substrate 180 also comprises the positive input terminal 101 and the negative input terminal 102 for receipt of the DC or AC input voltage $V_{in}$ from the voltage or power source of the converter. The upper or under surface 182 of the substantially flat carrier substrate 180 comprises the positive and negative output terminals 110, 111, respectively, for supplying the DC output voltage $V_{out}$, together with the accompanying output power and current, generated by converter to the intended load for example LED devices of a LED lamp.

The resonant DC-DC power converters 100 in accordance with preferred embodiments of the present invention may comprise an optional wireless or wired data receiver 190 for receipt of remote data commands to the output voltage or current control circuit 160. The remote data command may be used to interrupt, activate or adjust operation of the resonant DC-DC power converter via the output voltage or current control circuit 160. The remote data command may be subjected to a logical OR operation with the switch control signal otherwise provided by the output voltage or current control circuit 160 via signal wire or line 112. In this manner, the resonant DC-DC power converter can be switched ON or OFF or regulated via remote control and be integrated with a wireless or wired home automation network. The optional data receiver 190 may be compliant with various industry standard wireless data communication protocols such as the ZigBee communication protocols or wired data communication protocols such as the Digital Addressable Lighting Interface (DALI) interface and protocol.

Figure 2:
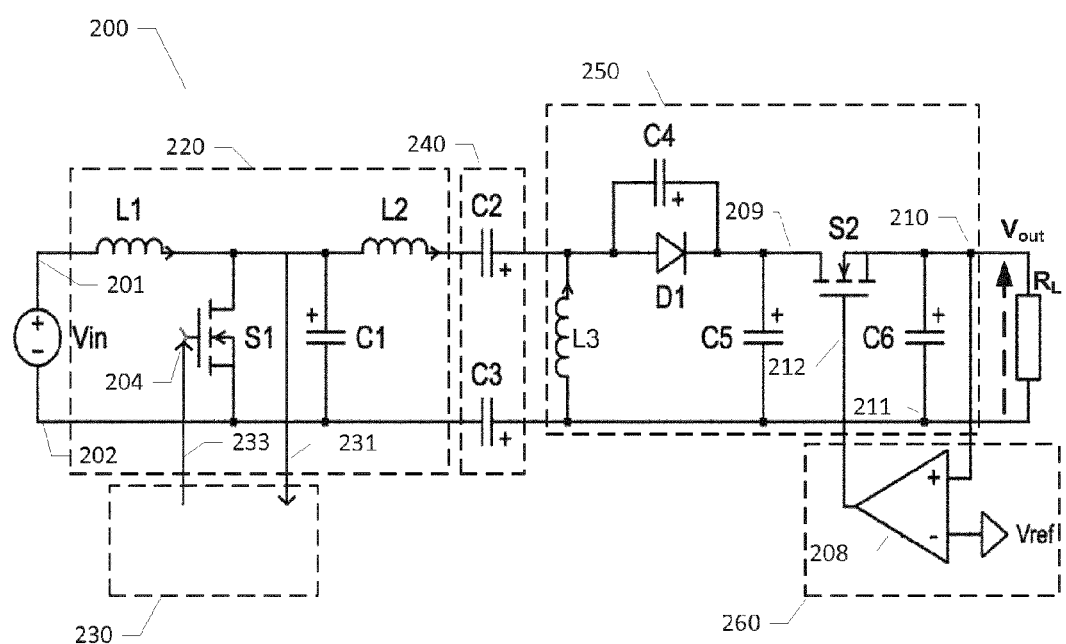
FIG. 2 is a simplified electrical circuit diagram of an isolated class E type of DC-DC power converter in accordance with a first embodiment of the invention.

FIG. 2 shows an electrical circuit diagram of an isolated class E DC-DC power converter 200. The power converter 200 comprises an input block 220 and an output block 250 connected through an optional galvanic isolation barrier 240 formed by series or coupling capacitors C2 and C3. The input side circuit 220 comprises a positive input terminal 202 and a negative input terminal 201 for receipt of a DC or AC input voltage $V_{in}$ from a voltage or power source. An input capacitor (not shown) may in addition be electrically connected between the positive and negative input terminals 201, 202 to form an energy reservoir for the input voltage source and suppress ac ripple voltage components and/or noise components of the DC or AC input voltage $V_{in}$. The input side circuit 220 additionally comprises a resonant network as discussed below which is alternatingly charged from the DC or AC input voltage $V_{in}$ and discharged through a class E rectification circuit 250 by a first controllable switch arrangement S1. The latter comprises a single controllable semiconductor transistor or switch S1 in the present embodiment. The skilled person will understand that the first controllable switch arrangement S1 may comprise a plurality of controllable semiconductor transistors or switches in other embodiments of the invention. The first controllable switch arrangement S1 may for example comprise a half-bridge arrangement with a pair of stacked semiconductor transistors or switches in a corresponding class DE embodiment of the resonant DC-DC power converter. The single controllable semiconductor switch S1 may comprise a transistor such as a MOSFET or IGBT, for example a Gallium Nitride (GaN) or Silicon Carbide (SiC) MOSFET.

The resonant network comprises at least a first inductor L1, a first capacitor C1, which may be a parasitic capacitance of part of S1, and second inductor L2 and the coupling capacitors C2 and C3 of the galvanic isolation barrier 240. The capacitance of the coupling capacitor C3 may be much larger than the capacitance of C2, e.g. more than 10 times larger, such that the effect of the capacitance of C3 may be neglected in setting of the resonance frequency of the resonant network. The charging and discharging, or excitation, of the resonant network follows the first switch control signal applied to a control or gate terminal 204 of semiconductor switch S1 such that the switch S1 alternates between an conducting/on-state and a non-conducting/off-state at the frequency of the first switch control signal when the resonant power converter 200 is active or ON. The power converter 200 is preferably designed or configured such that a frequency of the first switch control signal is situated in close proximity to the resonance frequency of the resonant network when an on-state or conducting state of a second controllable semiconductor switch S2 is selected as explained in detail below. Hence, the switching frequency of the resonant power converter 200 corresponds to the frequency of the first switch control signal when the converter is ON or active. The state switching of semiconductor switch S1 generates a resonant current in the resonant network flowing from an output of the resonant network through a class E rectification circuit of the output block 250 to produce a rectified DC output voltage $V_{out}$ across a rectification capacitance. The class E rectification circuit comprises inductor L3, rectifier diode D1 and capacitor C4. The skilled person will understand that the inductor L3 and capacitor C4 may influence the setting of resonance frequency of the resonant network depending on how the converter is dimensioned, However, the influence of the rectification components L3 and C4 may be minimal in power converter embodiments where the rectification circuit is configured to exhibit an essentially resistive input impedance at the resonance frequency of the resonant network when the switch S2 is in its conducting state or on-state. The capacitors C5 and C6 ensure a stable converter output voltage or current.

The output block furthermore comprises a positive and a negative output terminal 210, 211, respectively, which supply the converter DC output voltage $V_{out}$ to a converter load $R_L$ of the class E power converter 200. The converter load is schematically illustrated by load resistor $R_L$ on the drawing, but may in practice include different types of electric loads for example a set of LED diodes or a rechargeable battery etc. The second controllable semiconductor switch S2 is placed in-between a positive output node 209 of the rectification circuit and the converter load $R_L$. Hence, S2 is placed in series with the converter load such that the latter is disconnected from the class E power converter 200 when switch S2 is switched to its off-state or non-conducting state. In this off-state of S2, the capacitor C6 is electrically isolated from the converter rectification circuit, but may supply power to the converter load momentarily while the DC output voltage of the power converter declines due to current drawn by the converter load $R_L$. In the opposite situation, where S2 is placed in its on-state or conducting state, the positive output node 209 of the rectification circuit is connected to the converter load $R_L$ and the rectification capacitors C5 and C6 are placed in parallel so as to form a joint output capacitor of the power converter 200. The skilled person will understand that the second controllable semiconductor switch S2 preferably is designed or selected such that its on-resistance is markedly smaller than an equivalent load resistance, e.g. at least 10 times smaller, to minimize the on-state power loss in S2 and a voltage drop across S2.

The second controllable semiconductor switch S2 preferably comprises at least one MOSFET transistor such as a NMOS transistor. The second controllable semiconductor switch S2 may of course be formed by a plurality of parallelly connected individual semiconductor switches such as a plurality of parallelly connected MOSFETs. The skilled person will understand that the arrangement of the second controllable semiconductor switch S2 operates to connect the converter load $R_L$ to the output of the rectifier in the conducting state of switch S2 and disconnect the converter load $R_L$ from the output node 209 of the rectifier in the non-conducting state of the switch S2. This in effect changes the loading at the output of the resonant network presented by the rectification circuit because the equivalent input impedance of the rectification circuit increases markedly when the converter load $R_L$ is disconnected by the switch S2. This change of loading on the output of the resonant network caused by the state switching of switch S2 changes the impedance response characteristics of the resonant network such that the latter exhibits a second and different impedance response characteristic in the non-conducting state of switch S2 (where the converter load is disconnected). This change of the impedance characteristics over frequency of the resonant network may for example comprise a change of Q value and/or a change of the resonance frequency. The impedance response characteristics of the resonant network may be represented by its impedance characteristics as seen from the output of the switch transistor S1, i.e. the drain terminal of S1 in the present embodiment. The Q of the impedance characteristics of the resonant network may for example change from a value between 5 and 20 in the conducting state of switch S2 down to a value between 0.5 and 2 in the non-conducting state of switch S2. The resonance frequency of the resonant network may for example decrease with a factor somewhere between 1.4 and 3 such as about 1.41 from the conducting state to the non-conducting state of switch S2 for example from about 30 MHz to about 21 MHz. The class E power converter 200 further comprises an output voltage control circuit 260 which is configured to adjust the DC output voltage $V_{out}$ by enabling/activating or disabling/interrupting the first switch control signal on the gate terminal 204 of the first switch S1 in accordance with the selection of the first impedance characteristic or the second impedance characteristic of the resonant network. The output voltage control circuit comprises a comparator 208 and DC reference voltage generator (not shown) supplying a DC reference voltage $V_{ref}$ to a first input of the comparator 208. A comparator output is connected to a gate terminal 212 of the switch S2 to such that the comparator output selects one of the conducting state and non-conducting state of the switch S2 depending on the logic level of the comparator output. The control mechanism of the output voltage control circuit, which enables or disables the gate control signal on the switch S1, may respond to the selected impedance characteristics of the resonant network, as controlled by the state of switch S2, via different control and detection mechanisms. In one embodiment, a resonant phase detector 230 is configured to monitor, via monitor line of signal 231, a resonant voltage and a resonant current of the resonant network as described above in connection with the resonant phase detector 130. The resonant phase detector 230 produces in response supply a control signal 233 to the gate terminal 204 of the first switch S1 to selectively activate or interrupt the state switching of S1.

Another embodiment of the control mechanism of the output voltage control circuit comprises a self-oscillation feedback loop coupled between a drain, i.e. output terminal, and the gate terminal 204 of the switch S1. The first impedance characteristic of the resonant network is configured to enable oscillation of the self-oscillation feedback loop by design of a suitable loop gain. Hence, the gate signal of switch S1 will be active or enabled and switching at the oscillation frequency defined by the magnitude and phase characteristic of the loop of gain of the self-oscillation feedback loop. This oscillation frequency is the switching frequency of the class E power converter 200 during active or ON operation and will typically be situated close to an impedance maximum of the resonant network where the loop gain has the largest magnitude. The second impedance characteristic of the resonant network is conversely configured to disable or interrupt the oscillation of the self-oscillation feedback loop by changing the loop gain of the self-oscillation feedback loop in a suitable manner. When the oscillation of the self-oscillation feedback loop is interrupted, the gate control signal on the gate 204 of switch S1 is disabled or interrupted for example clamped to a constant voltage level below a threshold voltage of S1 if the latter is a MOSFET. As explained above the output voltage control circuit activates or interrupts/deactivates the class E converter 200 by controlling the state of the second switch S2 which switch state in turn enables or disables the self-oscillation of the feedback loop around switch S1. The latter determines the switching frequency of the class E power converter 200. Consequently, the on-state or conducting state of switch S2 where the converter load is connected enables normal or ON operation of the class E power converter 200. The class E power converter 200 is furthermore switched OFF or to a non-operational state by selecting the off-state of the second switch S2 where the converter load is disconnected via a suitable gate signal on the gate terminal 212 of S2. In this manner, the output voltage control circuit 260 provides on/off control of the class E power converter 200 to adjust the DC output voltage via state switching of switch S2 in a highly efficient and convenient manner. In particular, the on/off control is carried out by the changing the state of the switch S2, placed on a secondary or output side of the class E power converter 200, from a control signal derived from the secondary side circuit. Therefore, the adjustment of the DC output voltage is achieved without transmitting any control signal across the galvanic isolation barrier, formed by series capacitors C2 and C3 in the present embodiment, to the switch S1 on the input side circuit as explained in further detail below with reference to the self-oscillation based DC-DC power converter embodiments depicted on FIG. 4 and FIG. 5.

The frequency of the switch control signal on the gate 204 of switch S1 is preferably at or above 20 MHz or even above 30 MHz to provide the so-called VHF type of resonant DC-DC power converter 200. The switch control signal may comprise a PWM modulated control signal. The rectification circuit may comprise a diode based rectifier or a synchronous rectifier in front of the rectification capacitor to produce the converter output voltage $V_{out}$ as a DC output voltage. The class E power converter 200 may comprise a capacitor C1 connected or arranged across drain and source terminals of the switch S1 to increase a resonant current and/or adjust/fine-tune a resonance frequency of the class E converter 200. Likewise, a yet further capacitor C4 may be arranged across the rectifying diode D1 to adjust a duty cycle of the resonant power converter 200.

Figure 3:
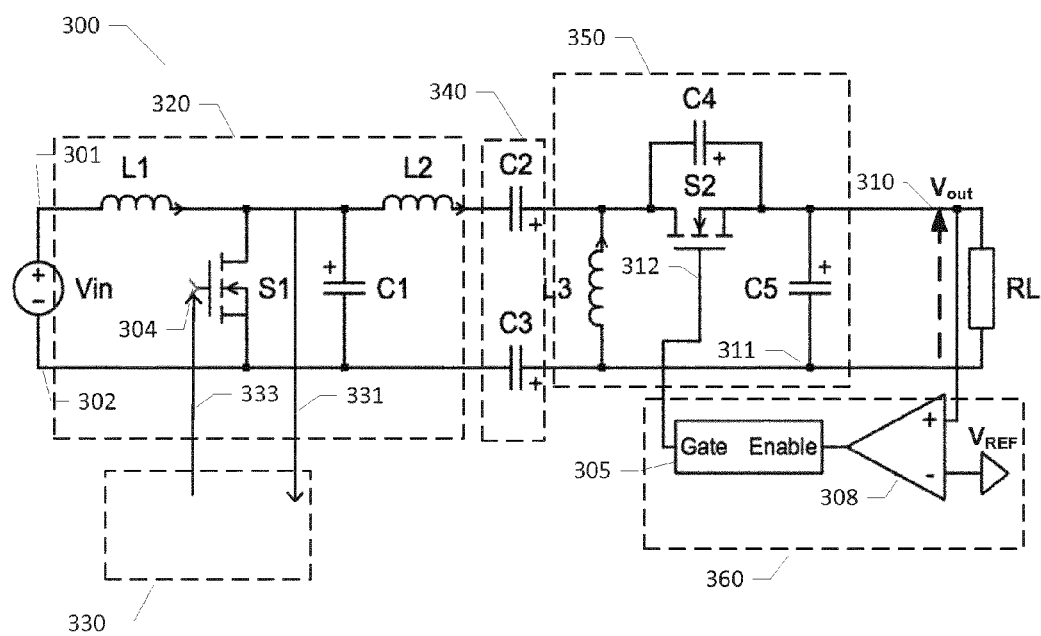
FIG. 3 is a simplified electrical circuit diagram of isolated class E type of DC-DC power converter in accordance with a second embodiment of the invention.

FIG. 3 is a simplified electrical circuit diagram of an isolated resonant class E type of DC-DC power converter 300 in accordance with a second embodiment of the invention. The main difference between the present class E converter 300 and the previous class E embodiment 200 lies in the integration of the functions of the separate rectifying diode D1 and the second controllable semiconductor switch S2 of the class E converter 200 in a single component S2 of the present class E power converter 300. The skilled person will appreciate that the above discussed features, functions and components of the first embodiment of the class E power converter 200 may apply to the present embodiment of the class E power converter 300 as well. Likewise, corresponding features and components of the first and second embodiments of the class E power converters 200, 300 have been provided with corresponding reference numerals to ease comparison.

The skilled person will understand that the arrangement and control of the second controllable semiconductor switch S2 in the class E power converter 300 serve two different functions. The first function is similar to the functionality of the switch S2 of the class E converter 200 discussed above, i.e. to connect the converter load $R_L$ to the output of the rectifier in the conducting state of switch S2 and disconnect the converter load $R_L$ from the output of the rectifier in the non-conducting state of the switch S2. The loading on the output of the resonant network applied by the rectification circuit is altered between the conducting and non-conducting states of switch S2 as discussed above because the equivalent input impedance of the rectification circuit increases markedly when the converter load $R_L$ is disconnected by switch S2. This change of loading on the output of the resonant network caused by the state switching of switch S2 changes the impedance characteristics of the resonant network such that it exhibits a second and different impedance characteristic in the non-conducting state of switch S2 (where the converter load is disconnected). This state switching is controlled by a voltage control loop comprising a comparator 308 and gate enable or drive circuit 305. An output of the gate drive circuit 305 is connected to a gate terminal 312 of the switch S2 and operable to determine the state of switch S2, i.e. conducting or non-conducting. A control circuit (not shown) is connected to the gate enable circuit 305 such that when switch S2 is in a conducting state during normal or ON operation of the class E power converter 300, the gate control signal on gate 312 is switched synchronously to the gate control signal of switch S1 on the input block 320. In this manner, the switch S2 operates as a synchronous half-wave rectifier and replaces the operation of rectifier diode D1 of the class E power converter 200. The rectification action of switch S2 generates the DC output voltage $V_{out}$ of the converter across a rectification capacitor C5 coupled across the negative and positive output terminals, 310, 311 of the class E power converter 300. The class E power converter 300 may comprise a capacitor C1 as illustrated connected or arranged across drain and source terminals of the switch S1 to increase a resonant current and/or adjust/fine-tune a resonance frequency of the class E power converter 300. Likewise, a yet further capacitor C4 may be arranged across the integrated rectifying switch and converter load switch S2 to adjust a duty cycle of the power converter 300. Also a self-oscillating gate drive may be used to drive the controllable switch S2 for synchronous rectification, in this way communication across the isolation barrier can be avoided.

Figure 4:
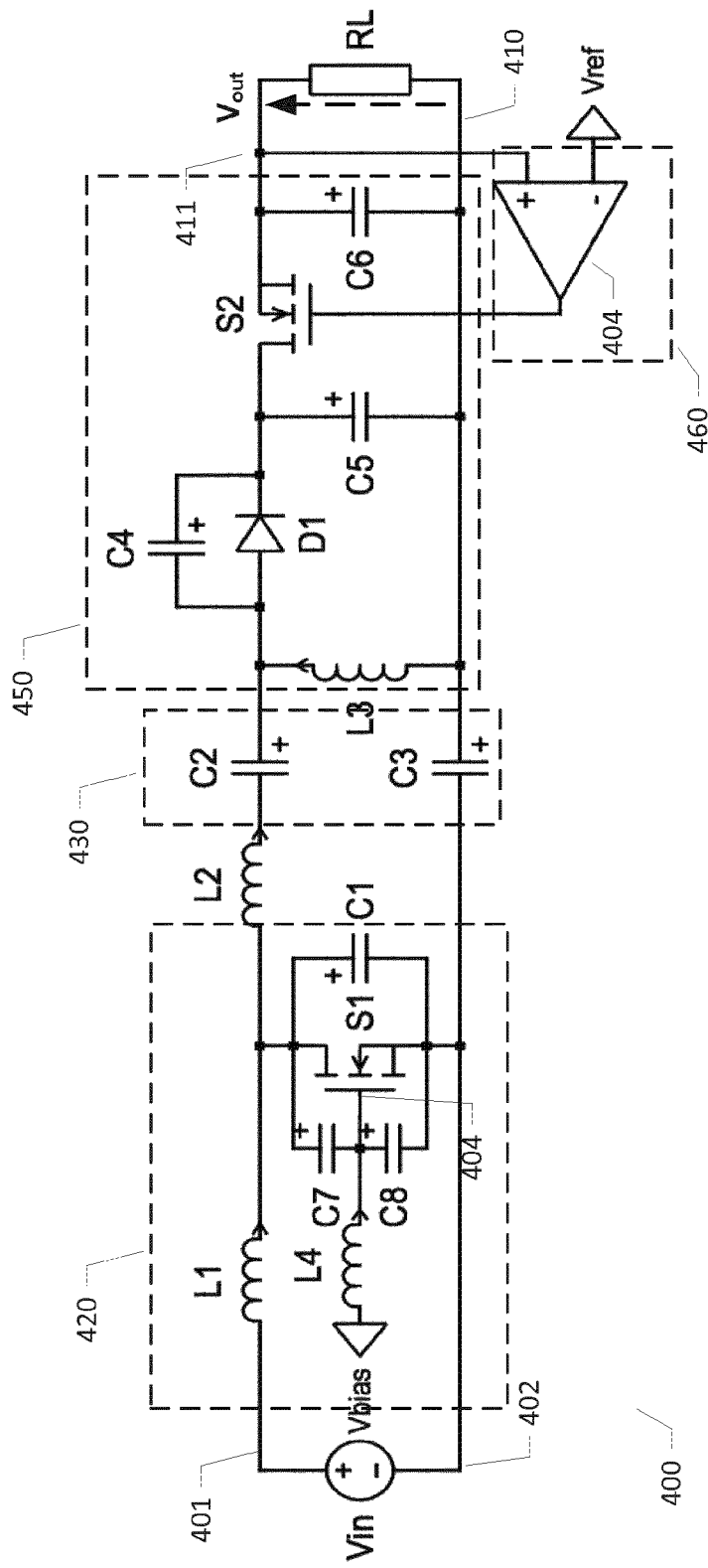
FIG. 4 is a simplified electrical circuit diagram of a self-oscillating isolated class E DC-DC power converter in accordance with a third embodiment of the invention.

FIG. 4 is a simplified electrical circuit diagram of a self-oscillating isolated class E DC-DC power converter 400 in accordance with a third embodiment of the invention. The main difference between the present class E power converter 400 and the previous class E converter 200 discussed in connection with FIG. 2 lies in the arrangement of a self-oscillation feedback loop coupled between an output or drain terminal of a first controllable semiconductor switch S1 and a control terminal 404 of switch S1. The self-oscillation feedback loop comprises a feedback capacitor C7 coupled between the drain and gate terminals of switch S1 and a series inductor L4 placed in-between the gate terminal 404 and a bias voltage source $V_{bias}$. The self-oscillation of the controllable semiconductor switch or transistor S1 is achieved by an appropriate phase shift induced by the combination of the feedback capacitor C7 and the gate inductor L4 in combination with an appropriate voltage gain provided by the first impedance characteristic of the resonant network. Hence, when the second controllable semiconductor switch S2 is placed in a conducting state, i.e. with the converter load $R_L$ connected to the output of the converter, the self-oscillation of the switch or transistor S1 is enabled. When the transistor S1 is self-oscillating the power converter 400 is ON or operational to supply a DC output voltage and current to the converter load $R_L$. In the opposite state, i.e. off-state, of switch S2, the resonant network, comprising at least L1, L2, C1 and C2, exhibits a markedly different, impedance characteristic from the first impedance characteristic due to the disconnection of the converter load $R_L$ from the output of the rectification circuit. The second impedance characteristic of the resonant network is configured to disable oscillation of the self-oscillation feedback loop around transistor switch S1. This may be achieved by designing the second impedance characteristic of the resonant network with a reduced Q factor and/or a changed resonance frequency compared to the first impedance characteristic. The Q factor at the resonance frequency of the first impedance characteristic may for example be larger than 5 or 10 while the Q factor at the resonance frequency of the second impedance characteristic may be smaller than 2 or 1. In addition, the resonance frequency of the first impedance characteristic may be arranged at a desired/target switching frequency of the DC-DC power converter 400 for example at or above 20 MHz or at or above 30 MHz while the resonance frequency of the second impedance characteristic may example at least 1.4 times lower than the resonance frequency of the first impedance characteristic. The skilled person will understand that the functionality of the previously discussed resonant phase detectors 130, 230, 330 is integrated into the self-oscillation feedback loop formed around the transistor S1. In this manner, oscillation of the self-oscillation feedback loop is either enabled or disabled according to the switch state of the second controllable switch S2.

The skilled person will understand that the each of the illustrated capacitors C7, C8 and C1 in practice may represent intrinsic device capacitances only of the transistor switch S1 for example drain-gate, gate-source and drain-source capacitances of a MOSFET transistor embodiment of switch S1. In the alternative, one or more of these intrinsic device capacitances may be supplemented by a parallelly connected external capacitor to provide a desired capacitance. The skilled person will appreciate that the above discussed features, functions and components of the output voltage control loop, rectification circuit and galvanic isolation barrier of first embodiment of the class E power converter 200 may apply to the corresponding components and circuits of present embodiment of the power converter 400 as well. Hence, corresponding components of the first and third embodiments of the class E power converters 200, 400 have been provided with corresponding reference numerals to ease comparison.

Figure 5:
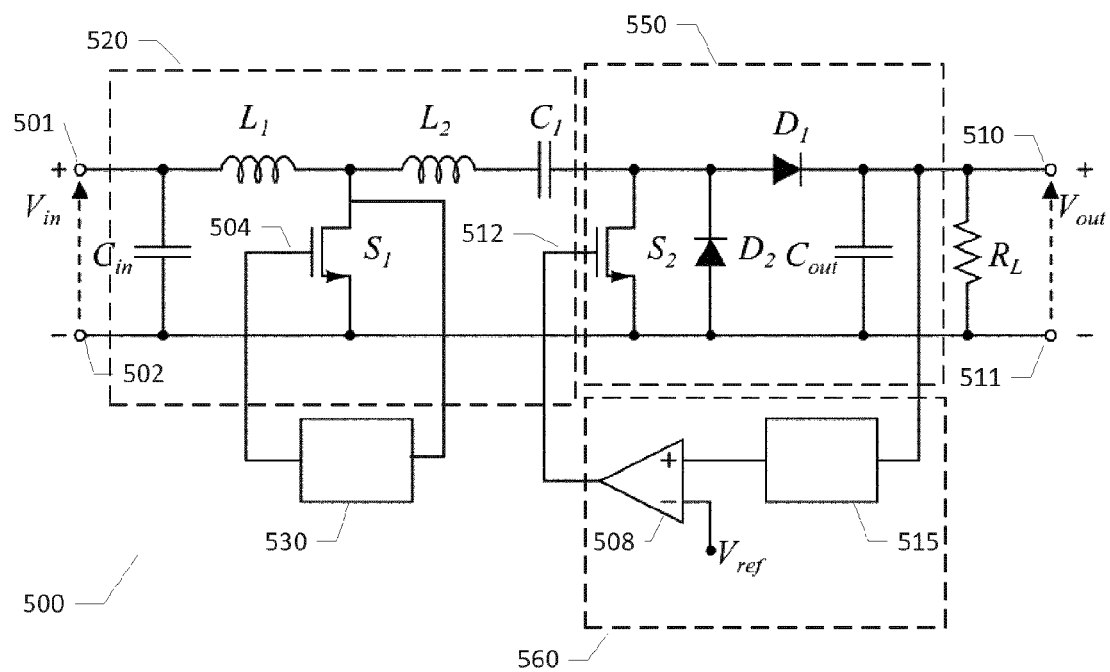
FIG. 5 is a simplified electrical circuit diagram of a non-isolated class E DC-DC power converter in accordance with a fourth embodiment of the invention.

FIG. 5 is a simplified electrical circuit diagram of a non-isolated resonant class E DC-DC power converter 500 in accordance with a fourth embodiment of the invention. The main difference between the present class E converter 500 and the previous class E converter 200, discussed in connection with FIG. 2, lies in the lack of a galvanic isolation barrier between the input block 520 and the output block 550 and the different coupling of the second controllable semiconductor switch S2. The converter output voltage $V_{out}$ is regulated by alternatingly activating and interrupting the first switch control signal on the gate terminal 512 of semiconductor switch S2 to turn ON and disable the resonant power converter 500 as discussed in connection with the description of the previous resonant power converter embodiments. The regulation of the DC output voltage $V_{out}$ of the power converter 500 is carried out by an output voltage control circuit 560 comprising a conditioning circuit 515 coupled to the converter output voltage $V_{out}$ and comparator 508. A reference input of the comparator 508 is coupled to a DC reference voltage $V_{ref}$ while another comparator input receives the DC output voltage after conditioning. As explained above, the comparator output signal provides a control signal to the gate terminal of the second controllable switch S2 to alternatingly switch the latter between its conducting and non-conducting states depending on the level of the DC output voltage relative to the DC reference voltage $V_{ref}$. The present DC-DC power converter 500 comprises a self-oscillation feedback loop, schematically illustrated by circuit box 530, to turn off and turn on the power converter 500 depending on the selected state of switch S2. The self-oscillation feedback loop may be connected between an output or drain terminal of a first controllable semiconductor switch S1 and a control terminal 504 of switch S1 as discussed above in connection with the third embodiment.

While the semiconductor switch S2 of each of the previously discussed power converter embodiments 200, 300, 400 is coupled in series between the resonant network output and the converter load, the corresponding switch S2 of the present power converter 500 is coupled across an output of the resonant network and a negative supply rail or ground rail 511 of the power converter 500. The resonant network of the power converter 500 comprises at least L1, L2 and C1. Hence, the switch S2 functions as an open circuit when it is placed in non-conducting state or off-state by the appropriate comparator output signal on the gate terminal 512 of S2. Hence, the switch S2 presents substantially no loading of the output of the resonant network in its non-conducting state so as to select a first impedance characteristic of the resonant network. In the conducting state of switch S2 it effectively short circuits the output of the resonant network to ground or the negative supply voltage line 511 via a low impedance path since the on-resistance of switch S2 may be significantly smaller than an impedance of the resonant network. Hence, the resonant network exhibits a second and preferably markedly different impedance characteristic in the conducting state of switch S2. In a similar manner as discussed above in connection with the self-oscillation network of the third embodiment 400, the second impedance characteristic of the resonant network is configured to disable oscillation of the self-oscillation feedback loop around transistor switch S1. This may be achieved by configuring the resonant network with a second impedance characteristic which exhibits a reduced Q factor and/or a changed resonance frequency compared to the same features of the first impedance characteristic. The Q factor at the resonance frequency of the first impedance characteristic may for example be larger than 5 or 10 while the Q factor at the resonance frequency of the second impedance characteristic may be smaller than 2 or 1. In addition, the resonance frequency of the first impedance characteristic may lie at or above 20 MHz such as at or above 30 MHz while the resonance frequency of the second impedance characteristic may be lower for example at least 1.4 times lower.

The invention claimed is:

1. A resonant DC-DC power converter comprising:
a single substantially flat carrier substrate comprising a first surface and a second, opposing, surface,
an input side circuit comprising a positive and a negative input terminal for receipt of an input voltage or current,
an output side circuit comprising positive and negative output terminals for supply of a converter output power, voltage or current and connection to a converter load,
a rectification circuit connected between an output of a resonant network and the output side circuit,
wherein the resonant network is configured for alternatingly being charged from the input voltage or current and discharged through the rectification circuit by a first controllable switch arrangement in accordance with a first switch control signal, wherein a frequency of the switch control signal is at or above 20 MHz,
a second controllable switch arrangement configured to select a first impedance characteristic of the resonant network in a first switch state and select a second impedance characteristic of the resonant network in a second switch state, and
an output voltage or current control circuit configured to adjust the converter output voltage and/or current by activating and interrupting the first switch control signal in accordance with a switch state of the second controllable switch arrangement,
wherein the input side circuit, the output side circuit, the rectification circuit, the resonant network, the first controllable switch arrangement, the second controllable switch arrangement and the output voltage or current control circuit are attached on the first surface and/or second surface of the single substantially flat carrier substrate.

2. The resonant DC-DC power converter according to claim 1, wherein the second controllable switch arrangement is coupled in series between an output of the rectification circuit and the positive or the negative output terminal to connect the converter load in a conducting switch state and disconnect the converter load in a non-conducting switch state.

3. The resonant DC-DC power converter according to claim 1, wherein the second controllable switch arrangement is coupled across the output of the resonant network to select the first impedance characteristic of the resonant network in a non-conducing state and the second impedance characteristic of the resonant network in a conducing state.

4. The resonant DC-DC power converter according to claim 1, wherein the rectification circuit comprises the second controllable switch arrangement; and
a control circuit configured for generating a control signal for the second controllable switch arrangement synchronously to the first switch control signal.

5. The resonant DC-DC power converter according to claim 1, wherein the output voltage or current control circuit comprises:
a self-oscillation feedback loop coupled between an output terminal and a control terminal of the first controllable switch arrangement; wherein the first impedance characteristic of the resonant network is configured to enable oscillation of the self-oscillation feedback loop; and the second impedance characteristic of the resonant network is configured to disable oscillation of the self-oscillation feedback loop.

6. The resonant DC-DC power converter according to claim 5, wherein the self-oscillation feedback loop comprises:
a first intrinsic switch capacitance coupled between the output and control terminals of the first controllable switch arrangement,
a first bias voltage source configured to generate a first adjustable bias voltage, and
a first inductor, having a substantially fixed inductance, coupled in-between the first bias voltage source and the control terminal of the first controllable switch arrangement.

7. The resonant DC-DC power converter according to claim 1, wherein a Q factor of the first impedance characteristic is larger than 5 at a resonance frequency of the first impedance characteristic; and
a Q factor of the second impedance characteristic is smaller than 2 at a resonance frequency of the second impedance characteristic.

8. The resonant DC-DC power converter according to claim 1, wherein a resonance frequency of the first impedance characteristic is at least 1.4 times larger than a resonance frequency of the second impedance characteristic.

9. The resonant DC-DC power converter according to claim 1, wherein the output voltage or current control circuit comprises:
a voltage or current regulation loop connected between the converter output voltage and a control terminal of the second controllable switch arrangement to adjust the converter output voltage in accordance with one or more DC reference voltage(s) or current(s).

10. The resonant DC-DC power converter according to claim 9, wherein the voltage or current regulation loop comprises:
a DC reference voltage generator configured to supply the one or more DC reference voltage(s) or current(s), and
one or more comparator(s) configured to compare the converter output voltage to at least a first DC reference voltage and select the conducting state or the non-conducting state of the second controllable switch arrangement depending on a result of the comparison.

11. The resonant DC-DC power converter according to claim 10, wherein the DC reference voltage generator is configured to supply a first DC reference voltage and a second DC reference voltage where the first DC reference voltage is higher than the second DC reference voltage;
wherein the one or more comparator(s) is configured to:
compare the converter output voltage to the first and second DC reference voltages;
select one of the conducting and non-conducting states of the second controllable switch arrangement in response to the converter output voltage exceeding the first DC reference voltage, and
select the opposite state of the second controllable switch arrangement in response to the converter output voltage falling below the second DC reference voltage.

12. The resonant DC-DC power converter according to claim 1, comprising a galvanic isolation barrier arranged between the input side circuit and the output side circuit.

13. The resonant DC-DC power converter according to claim 12, wherein the galvanic isolation barrier comprises first and second coupling capacitors.

14. The resonant DC-DC power converter according to claim 1, wherein the first controllable switch arrangement comprises one or more semiconductor switches and the second controllable switch arrangement comprises one or more semiconductor switches;
    wherein each of the semiconductor switches comprises a semiconductor transistor, a MOSFET, an IGBT, a Gallium Nitride (GaN) MOSFET or a Silicon Carbide (SiC) MOSFET.

15. The resonant DC-DC power converter according to claim 1, further comprising:
    a wireless or wired data receiver configured to receive remote data commands that control the switch state of the second controllable switch arrangement.

16. The resonant DC-DC power converter according to claim 1, wherein the single substantially flat carrier substrate comprises a single sided or double-sided printed circuit board.

17. A method of operating a resonant DC-DC power converter to generate a converter output voltage or current, said method comprising:
    a) alternatingly charging and discharging a resonant network of the resonant converter from an input voltage source by a first controllable switch arrangement in accordance with a first switch control signal having a frequency at or above 20 MHz,
    b) rectifying a resonant current of the resonant network,
    c) discharging a rectified resonant current through a rectification circuit to produce a rectified output voltage,
    d) switching between a first impedance characteristic or a second impedance characteristic of the resonant network by selecting a first or a second switch state of a second controllable switch arrangement, and
    e) adjusting a converter output voltage or current by alternatingly activating and interrupting the first switch control signal in accordance with first and second switch states of the second controllable switch arrangement,
    wherein the input side circuit, output side circuit, rectification circuit, resonant network, first controllable switch arrangement, second controllable switch arrangement and an output voltage or current control circuit are attached on a first surface and/or second surface of a single substantially flat carrier substrate.

* * * * *